(12) United States Patent
Honda et al.

(10) Patent No.: US 7,301,496 B2
(45) Date of Patent: Nov. 27, 2007

(54) RADAR APPARATUS

(75) Inventors: Kanako Honda, Kobe (JP); Masao Nakano, Yokohama (JP)

(73) Assignees: Fujitsu Ten Limited, Kobe (JP);
Fujitsu Limited, Kawasaki (JP)

( * ) Notice: Subject to any disclaimer, the term of this patent is extended or adjusted under 35 U.S.C. 154(b) by 218 days.

(21) Appl. No.: 11/189,732

(22) Filed: Jul. 27, 2005

(65) Prior Publication Data

US 2006/0028375 A1 Feb. 9, 2006

(30) Foreign Application Priority Data

Aug. 4, 2004 (JP) ............................. 2004-228615

(51) Int. Cl.
*G01S 7/40* (2006.01)
*G01S 13/42* (2006.01)

(52) U.S. Cl. .................. 342/70; 342/107; 342/108; 342/113; 342/173

(58) Field of Classification Search ............ 342/70–72, 342/107–116, 147, 159, 173, 174, 192, 196
See application file for complete search history.

(56) References Cited

U.S. PATENT DOCUMENTS

| 4,811,023 | A * | 3/1989 | Gelernter et al. ........... 343/703 |
| 5,402,129 | A | 3/1995 | Gellner et al. |
| 2004/0183713 | A1 | 9/2004 | Kumon et al. |
| 2005/0128081 | A1 * | 6/2005 | Kurita et al. ............ 340/552 |
| 2006/0028375 | A1 * | 2/2006 | Honda et al. ............ 342/70 |
| 2007/0052581 | A1 * | 3/2007 | Shima ................. 342/173 |

FOREIGN PATENT DOCUMENTS

| JP | A 07-280908 | 10/1995 |
| JP | A 09-502017 | 2/1997 |
| JP | A 2000-230974 | 8/2000 |
| JP | A 2002-162460 | 6/2002 |
| JP | A 2004-170371 | 6/2004 |
| JP | A 2004-233277 | 8/2004 |
| JP | 2006047114 A * | 2/2006 |

* cited by examiner

*Primary Examiner*—John B Sotomayor
(74) *Attorney, Agent, or Firm*—Oliff & Berridge, PLC

(57) ABSTRACT

In an FM-CW radar apparatus which determines the azimuth to a target by a phase monopulse technique, an abnormal value resulting from the presence of multiple targets is detected. Three receiving antennas are arranged at spacings of $5\lambda/4$ and $6\lambda/4$, respectively, and it is determined whether the difference between the azimuth obtained from the combination of the receiving antennas spaced $5\lambda/4$ apart and the azimuth obtained from the combination of the receiving antennas spaced $6\lambda/4$ apart is smaller than a predetermined value or not; when the condition has been satisfied n times in succession, it is determined that the detected value is normal. On the other hand, if the condition has not been satisfied n times in succession, or if the difference is not smaller than the predetermined value, it is determined that the detected value is an abnormal value resulting from the presence of multiple targets.

10 Claims, 7 Drawing Sheets

Fig.1

$\phi = \frac{2\pi}{\lambda} d_0 \sin\theta$

RADAR APPARATUS

BACKGROUND OF THE INVENTION

1. Field of the Invention

The present invention relates to a phase-monopulse radar apparatus.

2. Description of the Related Art

Figure 1:
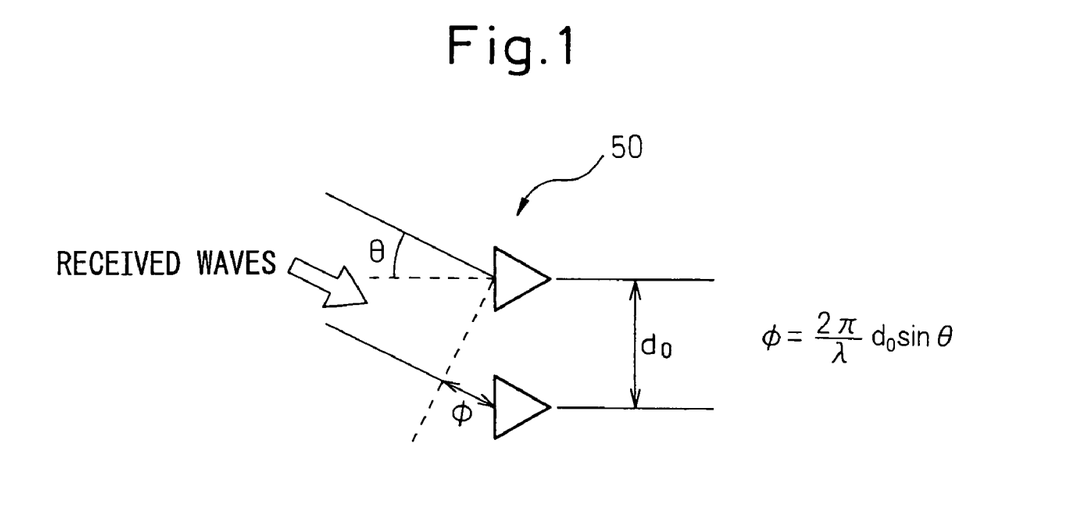
FIG. 1 is a diagram for explaining a phase-monopulse technique.

In a phase-monopulse radar apparatus, a wave reflected from a target is received using two receiving antennas 50, as shown in FIG. 1, and the azimuth angle θ of the target is determined from the phase difference φ between the two received signals by using, for example, the following equation.

$$\theta = \sin^{-1}(\lambda\phi/2\pi d_o) \quad (1)$$

where λ is the wavelength of the radar wave, and $d_o$ is the antenna spacing.

An FM-CW radar transmits a wave frequency-modulated by a triangular wave, produces a beat signal by mixing the received wave with a portion of the transmitted wave, and obtains the distance and the relative velocity of the target from the sum and the difference between the frequencies of the beat signals produced during the rising portion and the falling portion, respectively, of the triangular wave; such an FM-CW radar is used as an automotive radar. In this type of FM-CW radar, the received-phase difference φ is calculated from the phase values of the peaks that appear in the Fourier transformed results of the beat signals.

However, in a situation where a plurality of peaks due to reflections from a plurality of targets are so close to each other that they cannot be resolved on the frequency axis, what would be observed as the received-phase difference φ would be the phase of the combined version of the reflected waves returned from the plurality of targets, and the correct target azimuth could not be determined. This condition will be referred to as the azimuth fault condition (or multi-target condition). Such a situation occurs, for example, in the case of an automotive FM-CW radar, when two vehicles are traveling ahead side by side at approximately the same speed in the lanes adjacent to the right and left of the lane along which the radar-equipped vehicle is traveling, or when two vehicles are traveling ahead side by side at approximately the same speed, one in the same lane as the radar-equipped vehicle and the other in an adjacent lane. In such cases, as the distance and the relative velocity are nearly the same for the two vehicles, the frequencies during the rising portion and the falling portion of the triangular wave are close to each other between the two vehicles and therefore cannot be resolved, the resulting situation being the azimuth fault condition.

SUMMARY OF THE INVENTION

Accordingly, it is an object of the present invention to provide a phase-monopulse radar apparatus that can take appropriate action by detecting the azimuth fault condition.

According to the present invention, there is provided a radar apparatus comprising: at least three antennas; azimuth determining means for determining azimuth to a target from a received-phase difference between reflected waves received by two antennas selected in combination from among the at least three antennas; and azimuth fault condition detecting means for detecting that the azimuth determined by the azimuth determining means is an abnormal value due to reflections from multiple targets, by detecting an occurrence of phase folding in the received-phase difference.

The azimuth fault condition detecting means detects an azimuth fault condition by comparing with a predetermined value the difference between the detected azimuths calculated from the received-phase differences-obtained, for example, from two predetermined two-antenna combinations providing different antenna spacings.

In a phase-monopulse radar apparatus, if the phase difference exceeds ±π, "phase folding" occurs which is a phenomenon in which a phase difference folded by 2π is observed as shown by the following equation. If this happens, the true azimuth angle θ' of the target cannot be uniquely determined from the received-phase difference φ alone.

$$\theta' = \sin^{-1}\{\lambda(\phi \pm 2\pi k)/2\pi d_o\} \quad (k=0, 1, 2, \ldots)$$

Accordingly, the antenna spacing $d_o$ and the wavelength λ of the radiowave are usually designed so that phase folding will not occur within the azimuth angle θ' to be detected.

In contrast, in the present invention, the multi-target condition is detected by detecting occurrence of such phase folding. That is, as will be described in detail later, the detected azimuths calculated from the received-phase differences obtained, for example, from two two-antenna combinations providing different antenna spacings, agree with each other as long as phase folding does not occur in any one of the detected azimuths, but if phase folding occurs in at least either one of them, they no longer agree with each other. In the azimuth fault condition due to reflections from multiple targets, as the phase observed here is the phase of the combined version of the reflected waves returned from the multiple targets, the phase becomes unstable, resulting in reception similar to the case where phase folding occurs frequently.

Accordingly, the azimuth fault condition can be detected by comparing with the predetermined value the difference between the detected azimuths calculated from the received-phase differences obtained, for example, from the two two-antenna combinations providing different antenna spacings.

In the present invention, three antennas, for example, are arranged at unequally spaced intervals and, in this arrangement, if no phase folding occurs in any one of two combinations of two antennas, but phase folding occurs in the other combination of two antennas, the target azimuth θ' is calculated for that other combination by performing computation considering the phase folding. That is, in the present invention, the detected azimuth θ when phase folding occurs is not always determined as being an abnormal value.

DESCRIPTION OF THE PREFERRED EMBODIMENTS

Figure 2:
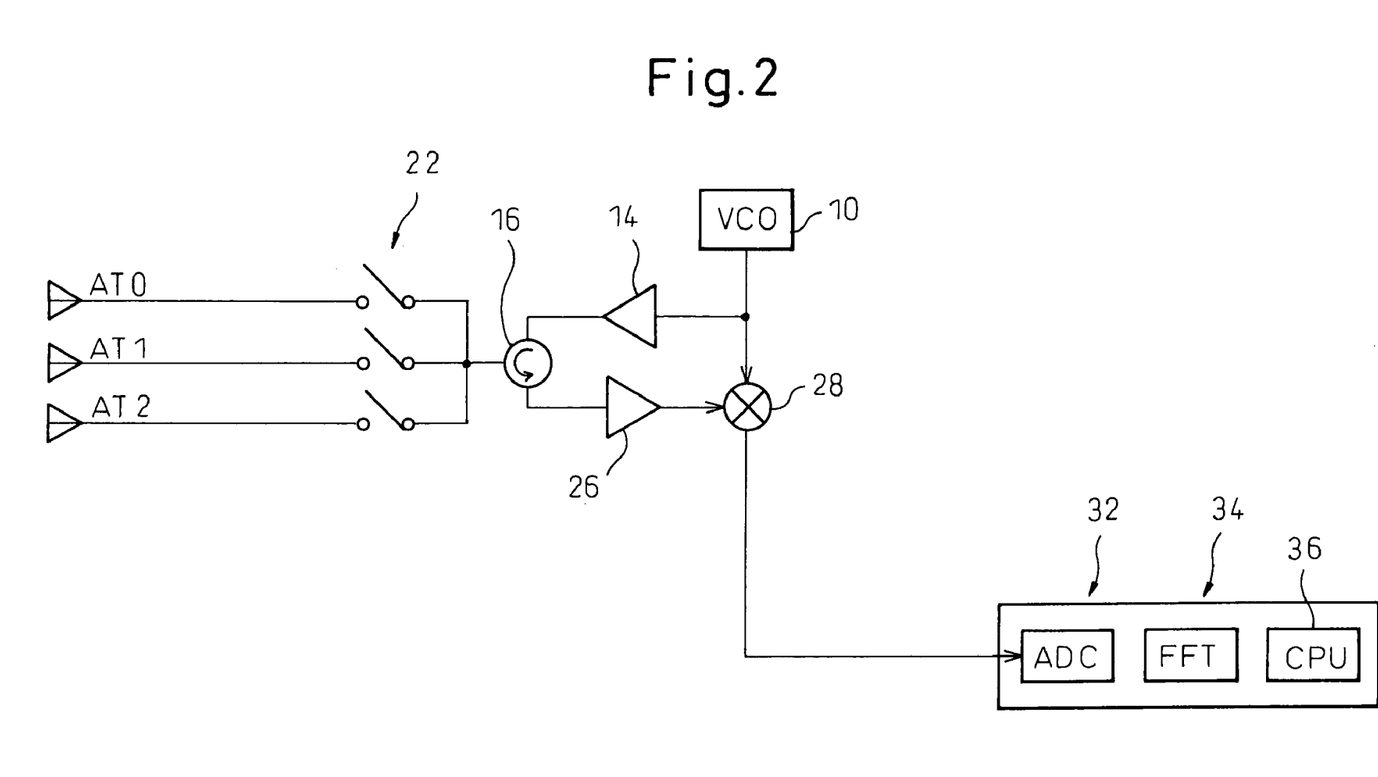
FIG. 2 is a diagram showing a first configuration example of an automotive FM-CW radar apparatus to which the present invention is applied.

FIG. 2 is a block diagram showing a first configuration example of an automotive FM-CW radar apparatus according to one embodiment of the present invention. In FIG. 2, a transmitter signal frequency-modulated by a triangular wave is output from a voltage-controlled oscillator (VCO) 10, amplified by a transmitter amplifier 14, and supplied via a circulator 16 to an antenna for transmission. In the radar apparatus shown in FIG. 2, of three antennas AT0, AT1, and AT2, an antenna selected by a switch 22 is used for transmission or reception. The signal is transmitted from the antenna selected by the switch 22, and the signal received by the antenna selected by the switch 22 is supplied via the circulator 16 to a receiver amplifier 26 where the signal is amplified; the amplified signal is mixed in a mixer 28 with a portion of the transmitted wave to produce a beat signal. The beat signal produced in the mixer 28 is converted by an A/D converter 32 into a digital signal, which is fast Fourier transformed (34) and input to a CPU 36.

Figure 3:
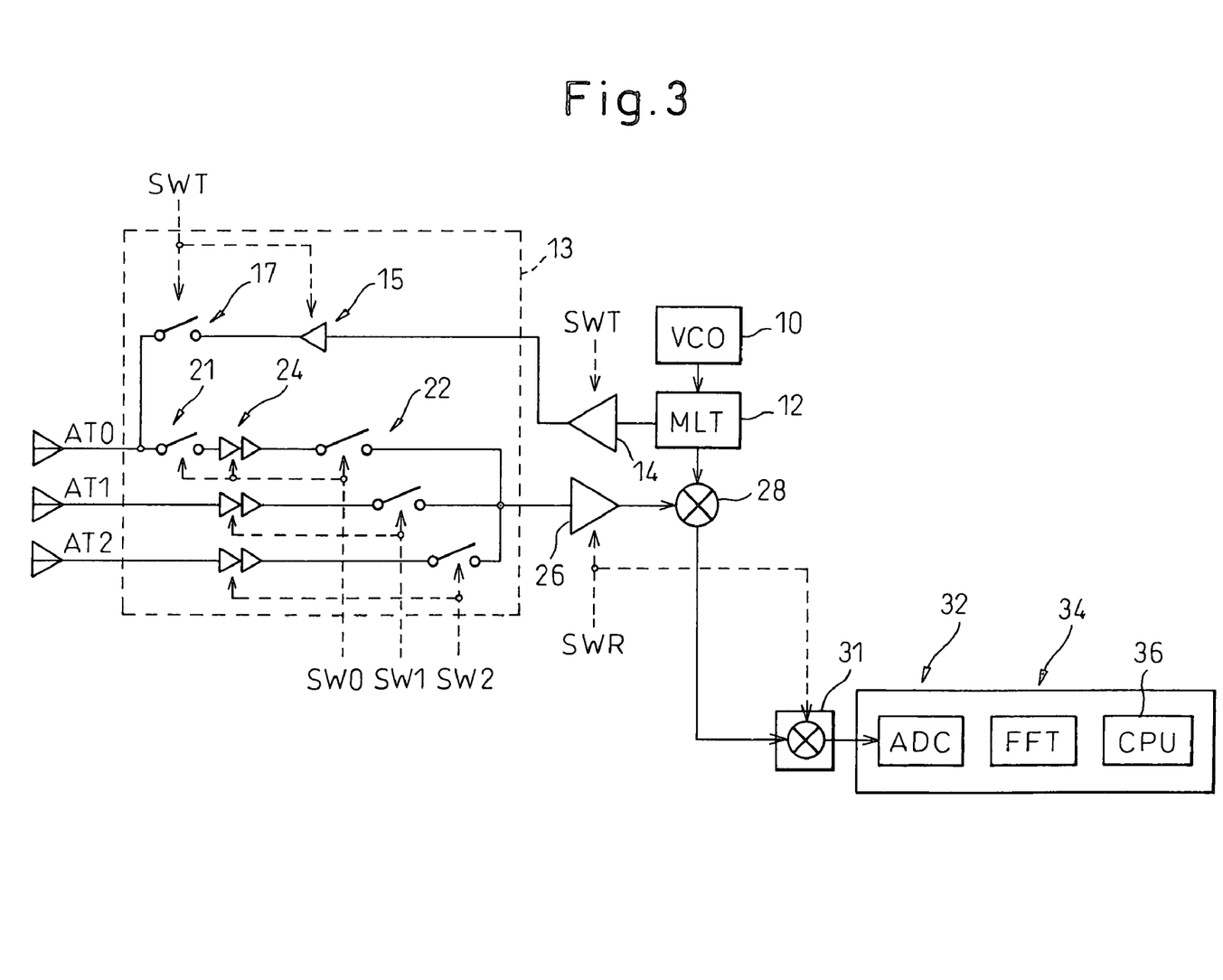
FIG. 3 is a diagram showing a second configuration example of the automotive FM-CW radar apparatus to which the present invention is applied.

FIG. 3 is a block diagram showing a second configuration example of the automotive FM-CW radar apparatus according to the one embodiment of the present invention. In FIG. 3, the transmitter signal frequency-modulated by the triangular wave, output from the voltage-controlled oscillator (VCO) 10, is supplied to a multiplier 12 where the signal is multiplied to produce a millimeter-wave signal, which is then amplified by the transmitter amplifier 14 and fed to an antenna selecting switch 13; in the antenna selecting switch 13, the signal is passed via an amplifier 15 and a switch 17 and transmitted out from the antenna AT0. In the radar apparatus shown in FIG. 3, of the three antennas AT0, AT1, and AT2, only the antenna AT0 is used for transmission while, on the other hand, one of the three antennas AT0, AT1, and AT2 that is selected by the switch 22 is used for reception. A switch 21 for preventing the transmitter signal from leaking into the receiver side is provided between the antenna AT0 and an amplifier 24. If some other means is provided that can prevent the leakage into the receiver side, the switches 17 and 21 need not be provided.

The signal received by each antenna is amplified by the amplifier 24 and supplied via the switch 22 to the receiver amplifier 26 where the signal is amplified, and the amplified signal is mixed in the mixer 28 with a portion of the transmitted wave to produce a beat signal. The beat signal produced in the mixer 28 is converted by the A/D converter 32 into a digital signal, which is fast Fourier transformed (34) and input to the CPU 36. A mixer 31 is provided to cancel the frequency superimposed on the beat signal by mixing it with the same frequency, because switching is made between transmission and reception by using a signal SWR.

Here, as shown in FIG. 3, the on/off operation of the switch 17 is synchronized with the on/off of the amplifier 15 which is performed by turning on an off a bias voltage to the amplifier 15, and likewise, the selecting operation of the switches 21 and 22 is synchronized with the on/off of the amplifier 24.

Figure 4:
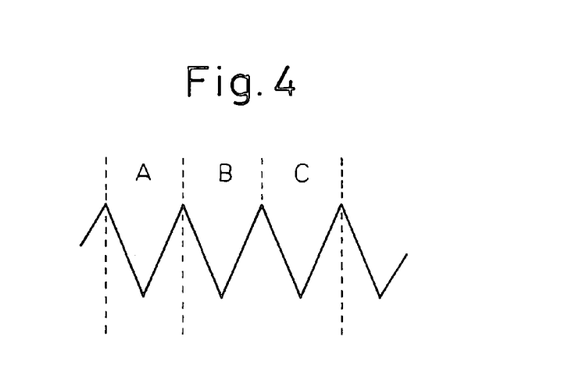
FIG. 4 is a waveform diagram showing a wave modulated by a triangular wave.
Figure 5:
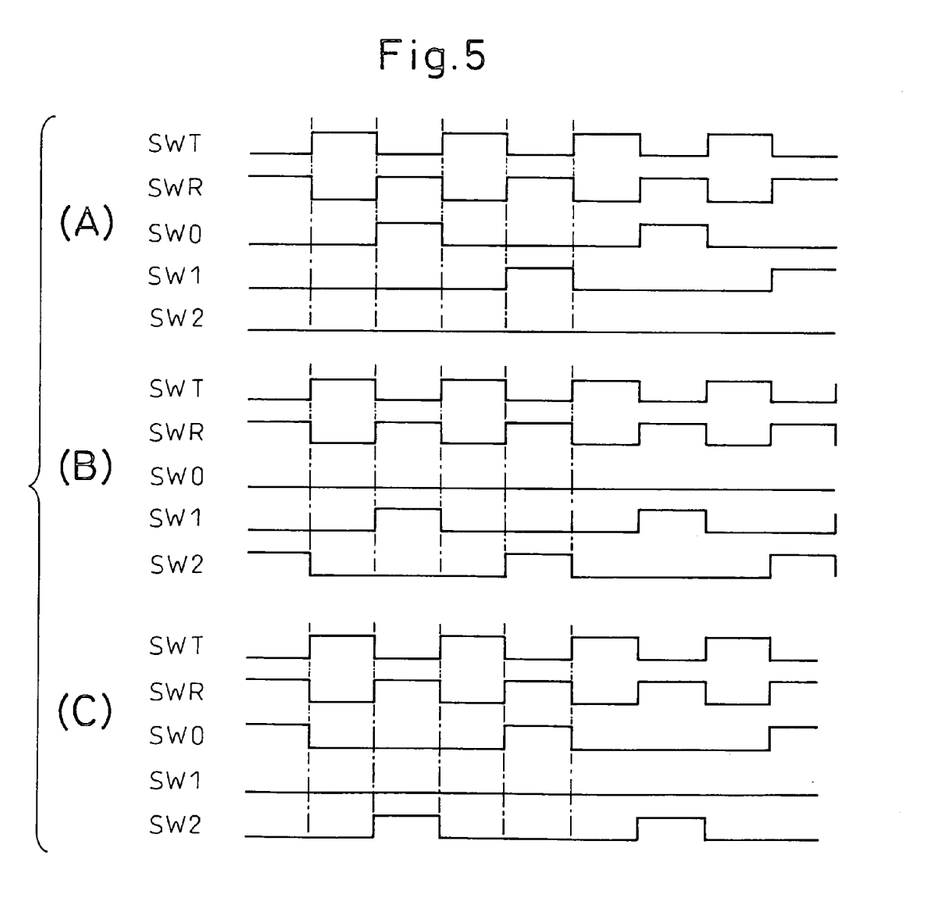
FIG. 5 is a waveform diagram showing the waveforms of various control signals in FIG. 3.

FIG. 4 shows the waveform of the triangular wave applied to the voltage-controlled oscillator 10 in FIG. 3, and parts (A) to (C) of FIG. 5 show the waveforms of the control signals SWT, SWR, SW0, SW1, and SW2 during the periods indicated by A to C respectively in FIG. 4. The time scale of the horizontal axis in FIG. 4 is greatly compressed compared with that in FIG. 5.

In the first cycle of the triangular wave shown in FIG. 4, that is, in the period A, a sequence of operations consisting of transmission, reception by AT0, transmission, and reception by AT1, in this order, is repeatedly performed as can be seen in FIG. 5(A). That is, in the period A, data is collected concerning the beat signals respectively produced from the signals received by the receiving antennas AT0 and AT1 during the rising and falling portions of the triangular wave. The frequencies of the peaks appearing in their Fourier transformed results are used to compute the distance and the relative velocity of the target, while the phases of the peaks are used to compute the phase monopulse implemented by the antennas AT0 and AT1.

In the second cycle of the triangular wave shown in FIG. 4, that is, in the period B, a sequence of operations consisting of transmission, reception by AT1, transmission, and reception by AT2, in this order, is repeatedly performed as can be seen in FIG. 5(B). That is, in the period B, data is collected concerning the beat signals respectively produced from the signals received by the receiving antennas AT1 and AT2 during the rising and falling portions of the triangular wave. The frequencies of the peaks appearing in their Fourier transformed results are used to compute the distance and the relative velocity of the target, while the phases of the peaks are used to compute the phase monopulse implemented by the antennas AT1 and AT2.

In the third cycle of the triangular wave shown in FIG. 4, that is, in the period C, a sequence of operations consisting of transmission, reception by AT2, transmission, and reception by AT0, in this order, is repeatedly performed as can be seen in FIG. 5(C). That is, in the period C, data is collected concerning the beat signals respectively produced from the signals received by the receiving antennas AT2 and AT0 during the rising and falling portions of the triangular wave. The frequencies of the peaks appearing in their Fourier transformed results are used to compute the distance and the relative velocity of the target, while the phases of the peaks are used to compute the phase monopulse implemented by the antennas AT2 and AT0.

In the radar apparatus shown in FIGS. 2 and 3, the antennas AT0, AT1, and AT2 are preferably arranged at unequally spaced intervals; for example, the spacing between AT0 and AT1 is chosen to be $5\lambda/4$ and the spacing between AT1 and AT2 to be $6\lambda/4$, where $\lambda$ is the wavelength of the carrier wave.

Figure 6:
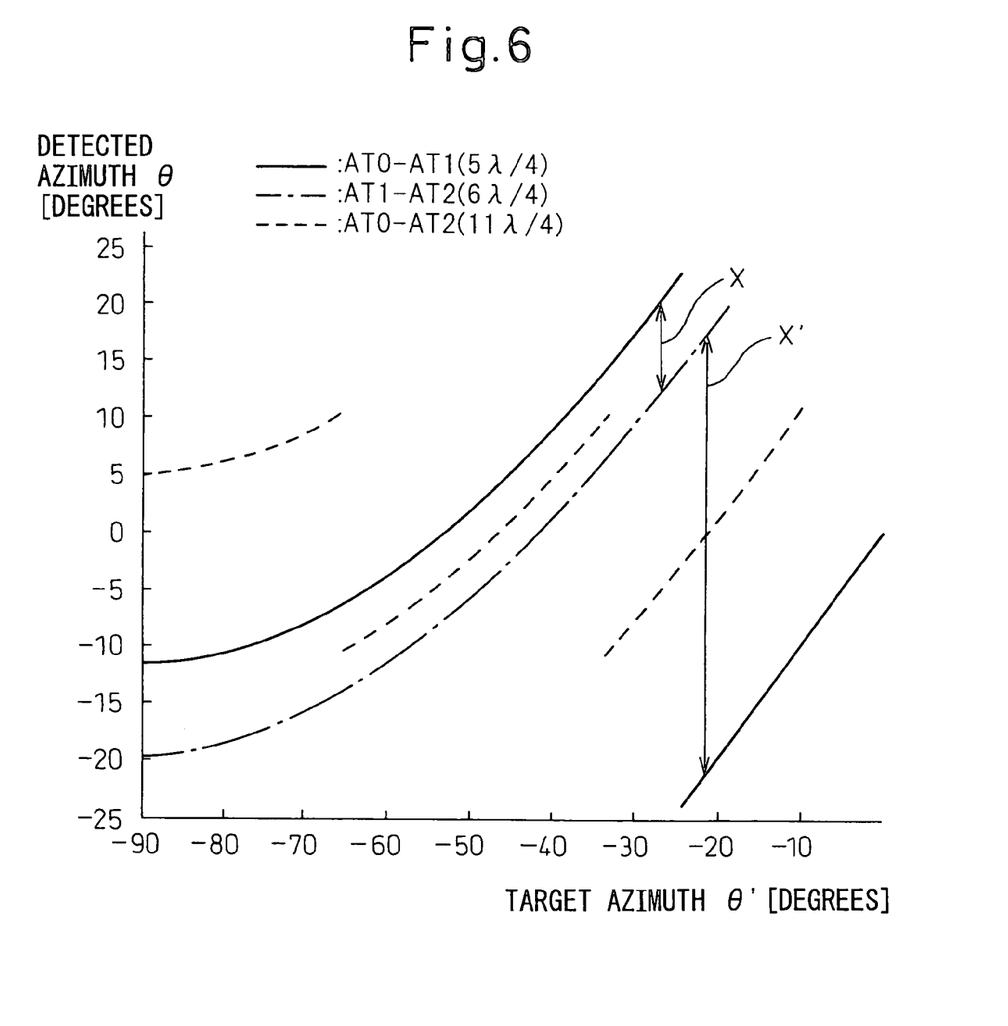
FIG. 6 is a graph showing the relationship between detected azimuth θ and target azimuth θ' for various antenna spacings.

FIG. 6 shows the relationship between the detected azimuth θ, calculated from the detected phase difference φ by using the equation (1) without considering phase folding, and the true azimuth θ' of the target. As shown by a solid line in FIG. 6, when phase-monopulse processing is performed between the antennas AT0 and AT1 spaced $5\lambda/4$ apart, the detected azimuth θ agrees with the target azimuth when the target azimuth θ' is in the range from 0 degree to about −24 degrees, since no phase folding occurs in this range, but in the range from −24 degrees to −90 degrees, phase folding occurs once. On the other hand, as shown by a semi-dashed line in FIG. 6, when phase-monopulse processing is performed between the antennas AT1 and AT2 spaced 6λ/4 apart, the detected azimuth θ agrees with the target azimuth θ' when the target azimuth θ is in the range from 0 degree to about −19 degrees, since no phase folding occurs in this range, but in the range from −19 degrees to −90 degrees, phase folding occurs once. Further, as shown by a dashed line in FIG. 6, when phase-monopulse processing is performed between the antennas AT0 and AT2 spaced 11λ/4 apart, no phase folding occurs in the range from 0 degree to about −10 degrees, but first phase folding occurs at −10 degrees, second phase folding occurs at −34 degrees, and third phase folding occurs at −66 degrees.

Here, by noting the difference between the detected azimuth θ obtained with the antenna spacing 5λ/4 and the detected azimuth θ obtained with the antenna spacing 6λ/4, it can be seen that both agree when the target azimuth θ' is in the range from 0 degree to −19 degrees, but that when θ' is in the range of −19 degrees to −90 degrees, i.e., the range where phase folding occurs in at least either one of them, a difference of about 7 degrees or larger always exists between the two, as shown by x and x' in FIG. 6. Accordingly, if there is a difference of 7 degrees or larger between the detected azimuth θ obtained with 5λ/4 and the detected azimuth θ obtained with 6λ/4, this means that phase folding has occurred in at least one of them.

On the other hand, in the multi-target condition, as the phase observed here is the phase of the combined version of the reflected waves returned from multiple targets, the phase becomes unstable, and a phase occurs that exhibits frequent phase folding. In view of this, if provisions are made to judge that the detected value is abnormal due to the presence of multiple targets if the absolute difference between the detected azimuth obtained with 5λ/4 and the detected azimuth obtained with 6λ/4 is equal to or larger than a predetermined value, and to judge that the detected value is normal if the difference is smaller than the predetermined value, then the occurrence of the multi-target condition can be detected. In this case, it is desirable to determine that the detected value is normal only when it has been judged to be normal a predetermined number of times in succession.

When the target azimuth θ' is in the range from −10 degrees to −19 degrees, no phase folding occurs for 5λ/4 and 6λ/4, but phase folding occurs for 11λ/4. In this range, the detected value is not determined as being an abnormal value resulting from the presence of multiple targets, but the target azimuth θ' is calculated for 11λ/4 by performing computation considering the phase folding. When the target azimuth θ' is 19 degrees or larger, the detected value is judged to be abnormal even if it is not due to the presence of multiple targets, but there will be no problem because, in this case, the value is determined to be outside the detection range, handling the situation as being equivalent to the multi-target situation.

Figure 7:
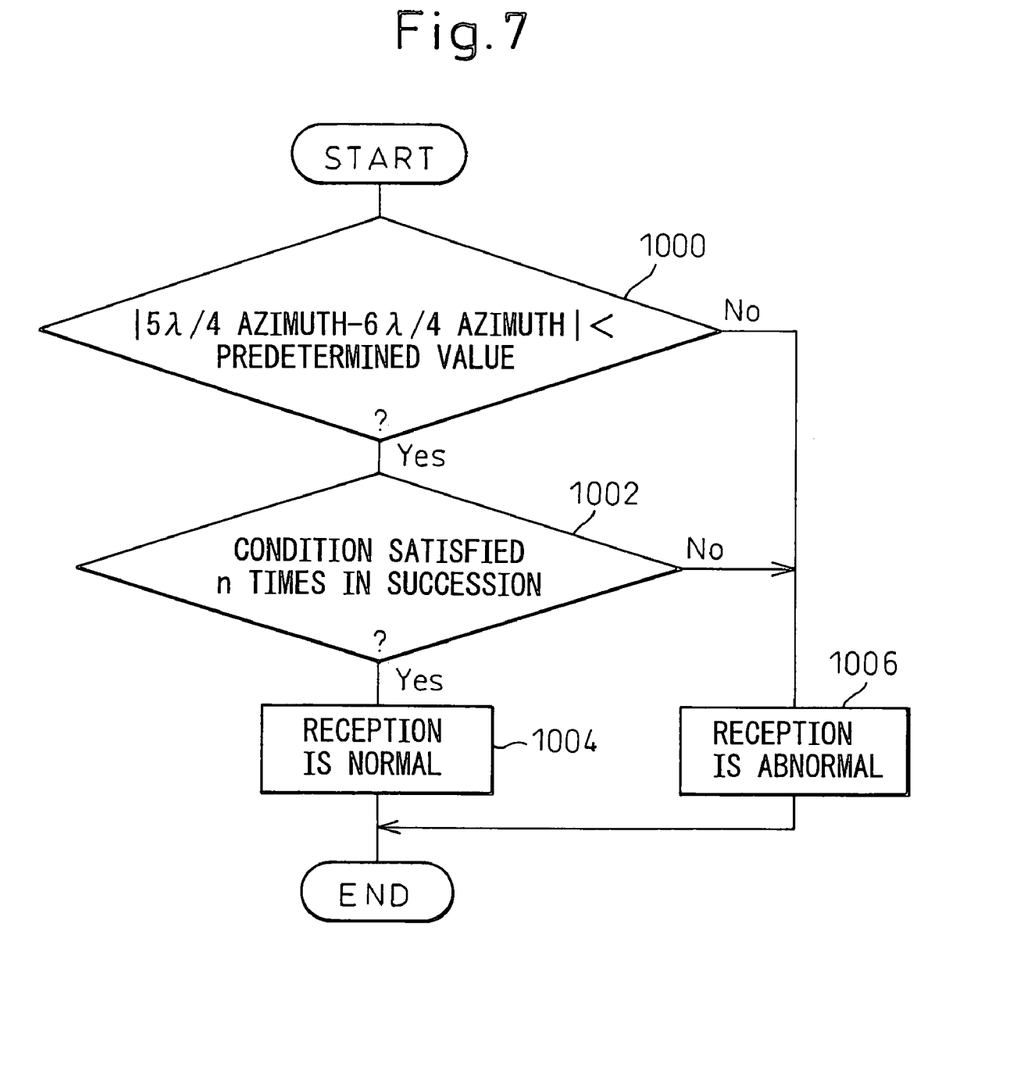
FIG. 7 is a flowchart illustrating an azimuth fault condition detecting process according to the present invention.

FIG. 7 is a flowchart illustrating one example of an azimuth fault condition detecting process according to the present invention. First, it is determined whether the absolute difference between the azimuth detected with 5λ/4 and the azimuth detected with 6λ/4 is smaller than the predetermined value or not (step 1000). If the difference is smaller than the predetermined value, then it is determined whether the condition has been satisfied a predetermined number, n, of times in succession (step 1002). If the condition has been satisfied n times in succession, then it is determined that the reception is normal (step 1004). On the other hand, if the condition has not been satisfied n times in succession, or if, in step 1000, the difference is not smaller than the predetermined value, it is determined that the detected value is an abnormal value resulting from the presence of multiple targets (step 1006). This process can be implemented by a software program created to program the operations of the CPU 36 (FIG. 2, 3).

Figure 8:
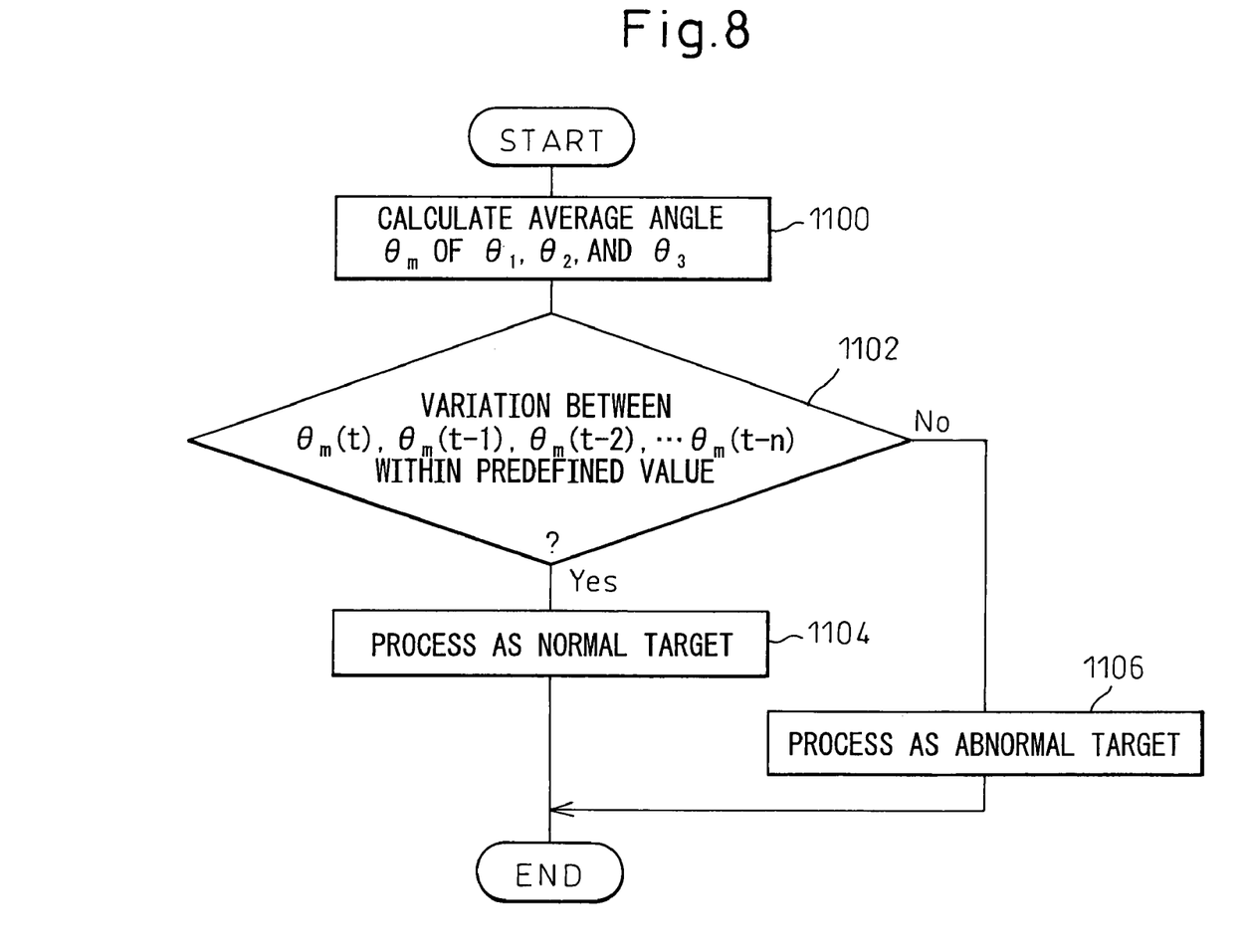
FIG. 8 is a flowchart illustrating a second example of the azimuth fault condition detecting process according to the present invention.

FIG. 8 is a flowchart illustrating a second example of the azimuth fault condition detecting process according to the present invention. The average value $\theta_m$ of the detected azimuths $\theta_1$, $\theta_2$, and $\theta_3$ respectively calculated from three two-antenna combinations is calculated (step 1100), and it is determined whether the variation between its present value $\theta_m(t)$ and n past values $\theta_m(t-1)$, $\theta_m(t-2)$, . . . , $\theta_m(t-n)$ is within a predefined value or not (step 1102). If it is within the predefined value, the detected value is judged to be normal (step 1104), but if it is not within the predefined value, the detected value is judged to be abnormal (step 1106).

In the automotive FM-CW radar, a continuity verification process is performed to track the motion of the target by comparing the present data with the past data and verifying that the detected peak is one obtained from the same target. If a peak corresponding to the past data cannot be obtained for some reason, then, for a predetermined period of time, it is assumed that the target is located at a position estimated from the position and speed predicted from the past data. Accordingly, if it is determined in the above multi-target detecting process that the detected value is an abnormal value resulting from the presence of multiple targets, thus being able to determine the azimuth to the target and hence the position of the target, the process also proceeds by assuming for the predetermined period of time that the target is located at a position estimated from the position and speed predicted from the past data.

Alternatively, if the situation is judged to be a multi-target situation, the azimuth to the target may be determined by performing DBF (digital beam forming) in the vicinity of the predicted azimuth by using the three receiving antennas.

The antenna spacings and the decision thresholds are not limited to those given in the above examples, but the only requirement here is that the spacings and the thresholds be determined so as to be able to detect phase folding in two two-antenna combinations providing different antenna spacings. Even in the case of an equally-spaced antenna arrangement, phase folding can be detected with the combination of the left or right antenna and the center antenna and the combination of the left and right antennas. Further, the number of antennas is not limited to three, but more than three antennas may be used.

The invention claimed is:

1. A radar apparatus comprising: at least three antennas; azimuth determining means for determining the azimuth to a target from a received-phase difference between reflected waves received by two antennas selected in combination from among the at least three antennas; and azimuth fault condition detecting means for detecting that the azimuth determined by the azimuth determining means is an abnormal value due to reflections from multiple targets, by detecting an occurrence of phase folding in the received-phase difference.

2. A radar apparatus according to claim 1, wherein the azimuth fault condition detecting means detects an azimuth fault condition by comparing the detected azimuth calculated from the received-phase difference obtained from a combination of two antennas selected from among the at least three antennas arranged at unequally spaced intervals, with the detected azimuth obtained from another combination, and by comparing the difference between the detected azimuths with a predetermined value.

3. A radar apparatus according to claim 2, wherein in any of two or more combinations, the two antennas are spaced apart by a distance greater than the wavelength of a carrier wave, the distance being different from one combination to another.

4. A radar apparatus according to claim 2, wherein the azimuth fault condition detecting means judges that the azimuth determined by the azimuth determining means is a normal value only when the difference between the detected azimuths has been judged to be smaller than the predetermined value a predetermined number of times in succession.

5. A radar apparatus according to claim 4, further comprising predicting means for predicting the position and the relative velocity based on the previously obtained position and relative velocity of the detected target when the azimuth determined by the azimuth determining means has been judged to be an abnormal value, and for determining the predicted position and relative velocity as being the position and relative velocity of the detected target.

6. A radar apparatus according to claim 4, further comprising second azimuth determining means for determining the azimuth to the target by beam forming from the received waves at the plurality of antennas when the azimuth determined by the azimuth determining means has been judged to be an abnormal value by the azimuth fault condition detecting means.

7. A radar apparatus according to claim 1 wherein, when the azimuth determined by the azimuth determining means has been judged to be an abnormal value, distance, relative velocity, and an azimuth fault flag are output as information concerning the target.

8. A radar apparatus according to claim 1, wherein when the azimuth determined by the azimuth determining means has been judged to be an abnormal value, the distance and velocity of the target are obtained from currently detected signals, and the azimuth is computed from the currently detected phase by applying a correction using a phase component based on the azimuth predicted from the past position and azimuth.

9. A radar apparatus according to claim 1, wherein an average is taken among the detected azimuths calculated from the received-phase differences in two or more predetermined combinations of two antennas selected from among the at least three antennas arranged at unequally spaced intervals, and wherein time-series processing is performed on the averages taken in the form of a time series and, if there is a large variation, it is determined that an azimuth fault condition has occurred.

10. A radar apparatus according to claim 9, wherein the time-series processing is performed on the averages whose distance and velocity information are close to each other.

* * * * *